(12) United States Patent
Lecourtier et al.

(10) Patent No.: US 11,288,618 B2
(45) Date of Patent: Mar. 29, 2022

(54) METHOD AND SYSTEM FOR ACCESSING LOCAL COMPUTER RESOURCES THROUGH A WEB BROWSER

(71) Applicant: QUADIENT TECHNOLOGIES FRANCE, Bagneux (FR)

(72) Inventors: Florent Lecourtier, Cadenet (FR); Jalal El Berkani, Avignon (FR); Jean-Francois Vlasic, Velleron (FR); David Cataldo, L'Isle sur la Sorgue (FR); David Charles, Graveson (FR)

(73) Assignee: QUADIENT TECHNOLOGIES FRANCE, Bagneux (FR)

( * ) Notice: Subject to any disclaimer, the term of this patent is extended or adjusted under 35 U.S.C. 154(b) by 764 days.

(21) Appl. No.: 15/963,845

(22) Filed: Apr. 26, 2018

(65) Prior Publication Data
US 2018/0315004 A1   Nov. 1, 2018

(30) Foreign Application Priority Data
Apr. 28, 2017 (EP) .................................. 17305482

(51) Int. Cl.
| | |
|---|---|
| *G06Q 10/08* | (2012.01) |
| *H04L 29/06* | (2006.01) |
| *G06F 8/61* | (2018.01) |
| *H04L 67/02* | (2022.01) |

(52) U.S. Cl.
CPC ............ *G06Q 10/083* (2013.01); *G06F 8/61* (2013.01); *H04L 63/10* (2013.01); *H04L 67/02* (2013.01); *H04L 63/168* (2013.01)

(58) Field of Classification Search
None
See application file for complete search history.

(56) References Cited

U.S. PATENT DOCUMENTS

| | | | |
|---|---|---|---|
| 7,685,595 B1 | 3/2010 | Manahan et al. | |
| 8,127,033 B1 | 2/2012 | Newstadt et al. | |
| 10,129,172 B1* | 11/2018 | Stafford | H04L 67/1044 |
| 10,574,587 B1* | 2/2020 | Stafford | H04L 67/1044 |
| 2013/0061337 A1* | 3/2013 | Zimberoff | G06Q 50/28 726/30 |
| 2016/0191645 A1* | 6/2016 | Hayton | H04L 67/02 709/203 |
| 2017/0168868 A1* | 6/2017 | Cristiani | G06Q 50/26 |

OTHER PUBLICATIONS

European Search Report, dated Nov. 20, 2017, for EP17305482, 2 pages.

* cited by examiner

*Primary Examiner* — Esther B. Henderson
(74) *Attorney, Agent, or Firm* — Cozen O'Connor

(57) ABSTRACT

A method of allowing secured access for a web browser of a client computer device to local resources wherein a web server hosting a shipping application executes the shipping application in response to web page requests received from the web browser, the method comprising the steps of: requesting directly to a shipping server agent by the web browser a usage of a web service of the shipping server agent for accessing the local resources, requesting directly to the shipping application by the shipping server agent an authorization for the usage of a web service by the web browser, providing an authorization response from the shipping application directly to the shipping server agent regarding the usage of a web service by the web browser, and accessing local resources by the shipping server agent according to the requesting by the web browser.

16 Claims, 3 Drawing Sheets

METHOD AND SYSTEM FOR ACCESSING LOCAL COMPUTER RESOURCES THROUGH A WEB BROWSER

FIELD OF THE INVENTION

The present application relates to a method and system in the field of processing shipments within a network, and in particular for providing access for a web browser to local computer resources, including for polling a local repository and for direct printing with local printers.

PRIOR ART

Systems commonly named shipping systems allow a user to prepare shipments for delivery by a carrier. Typical functionalities of shipping systems allow the user to choose the most appropriate services from among services proposed by a plurality of carriers, eventually helping selecting the less expensive shipments, allow the user to prepare for the shipments, to generate and to print shipment documentation, and to track shipments.

Originally, shipping systems were configured as shipping applications embedded within a scale or running on PC-based systems. Recently, with the development of internet technologies, a shipping application can be conveniently provided by a central remote server as a web application. In such a client-server configuration, local user systems have access to the web shipping application via a web browser. However, for security reasons, web browsers are allowed only minimal interactions with the resources of a local computer system such as the file system or external devices or peripherals such as a printer or a scale. A web browser runs the code provided by remote web servers into a sandbox, which does not allow accessing directly protected resources such as the file system or some external devices or peripherals such as a printer or a scale. Communications between a web browser and local resources are made possible by the integration within the web browser environment of an application programming interface (API) component, which handles requests from the web browser targeting local resources, and of a web browser communication plugin, which is an optional component of the web browser allowing the API component to communicate with the local user system. Such an API component is integrated within the web browser in a browser preconfigured sandbox environment with limited access to the local user system and its resources. For example, in a JAVA environment, the API component is an applet and the Netscape Plugin Application Programming Interface (NPAPI plugin) can be used as the component of the web browser allowing the applet to communicate with the local user system.

However, an API component integrated in web browser is not an optimal solution as it depends on the particular web browser that it is integrated in and it must be individually adapted to each web browser. Often, browser communication plugins are dependent on the operating system of the local user system and must be adapted to each specific operating system. As a result, API components and browser communication plugins typically have to be updated, or and least tested for compatibility, each time there are new releases of web browsers or operating systems in order to ensure application compatibility. Additionally, browser communication plugins have been identified as a cause of hangs, crashes, security incidents and code complexity. Also, browser communication plugins tend to be phased out from the market. In the exemplary case of a JAVA environment and of the use of an applet for communicating with the local user system, the applet typically can access directly local resources without any security check.

SUMMARY

An embodiment of the invention can be summarized as providing a method and an apparatus based on a third party software directly installed on the local computer and running as an embedded web server and overcoming the above drawbacks. This is achieved by providing a method of allowing secured access for a web browser of a client computer device to local resources wherein a web server hosting a shipping application executes the shipping application in response to web page requests received from the web browser, the method comprising: requesting directly to a shipping server agent of said client computer device by the web browser a usage of a web service of the shipping server agent for accessing the local resources, requesting directly to the shipping application by the shipping server agent an authorization for the usage of a web service by the web browser, providing an authorization response from the shipping application directly to the shipping server agent regarding the usage of a web service by the web browser, and accessing local resources by the shipping server agent according to the requesting by the web browser.

With the shipping server agent application, any request from the web browser for use of local resource is authorized by the shipping application hosted by the web server. The method using the shipping server agent is more secure than a method using an applet because an applet typically can directly access local resources without any authorization check.

The embodiment of the invention is characterized by direct communications between the web browser and the shipping server agent or between the shipping server agent and the web server hosting the shipping application, and is also characterized by the fact that the shipping server agent accepts requests only from the web browser. No intermediary component is used between the web browser and the shipping server agent. The particular architecture and the direct communication ensures for optimal performances and user experience, which would be degraded by the introduction of intermediary components such as a proxy for example.

In a preferred embodiment, the authorization response is based on comparing a session ID stored in a memory in the web server with a browser session ID memorized in the client computer device wherein the browser session ID is provided by the web browser via the shipping server agent to the web server.

According to a feature of the invention, the web browser provides the shipping server agent with an authorization uniform resource locator attached to the shipping application corresponding to an authorization web service of the shipping application for the authorization for the usage of a web service.

According to another feature of the invention, the web browser is configured via the shipping application for targeting a pre-defined port, which the shipping server agent listens to for connections and requests.

Preferably, the shipping server agent is accessed by the web browser via a dedicated internet protocol address for the shipping server agent. Advantageously, a web service of the shipping server agent is accessed by the web browser by using a uniform resource locator composed of the dedicated internet protocol address and of the pre-defined port and of an identification of the web service.

In a particular embodiment, the shipping server agent is accessed by using an internet domain name specifically created for the shipping server agent.

One particular advantage of the invention is that the shipping server agent runs as an embedded web server independently from the web browser and sends content requests to the shipping application when data from the shipping application is required for completing the requesting by the web browser.

Another object of the invention is that the web services of the shipping server agent include direct printing on a local printer controlled by a local operating system and accessing files stored in the client computer device.

In another embodiment, a path for the accessing files stored in the client computer device is pre-configured within the shipping server agent configuration parameters and no path is provided in the requesting of the usage of a web service of the shipping server agent by the web browser.

Preferably, the shipping server agent communicates with the web browser and the web server via hyper text transfer protocol secure protocol channels.

In another embodiment, the method further comprises the installation of the shipping server agent application, which is performed by a download via the internet from the shipping application onto the client computer device. The download includes selecting a listening port, which the shipping server agent uses for listening to the requesting of the usage of a web service by the web browser, and defining a path for the accessing files stored in the client computer device.

Advantageously, the web browser is configured via the shipping application for sending requests to the pre-defined port when the web browser requires using the web services from the shipping server agent.

In a preferred embodiment, the session ID is generated by the shipping application and transmitted by the web server to the web browser.

Embodiments of the invention also concern a client computer device for allowing secured access to local resources, comprising a web browser configured to directly access a shipping application hosted by a web server through a first communication channel between the web browser and the web server and a local operating system controlling the client computer device; characterized in that the client computer device further comprises a shipping server agent running as an embedded web server independently from the web browser and configured to directly access the shipping application through a second communication channel between the shipping server agent and the web server, wherein the shipping server agent through a third communication channel between the shipping server agent and the web browser provides to the web browser web services allowing secured access to the local resources. In a particular embodiment, the web services of the shipping server agent include direct printing on a local printer controlled by the local operating system and accessing files stored in the client computer device.

The shipping server agent is independent from the web browser and in communication with the web browser via web standard protocols, and therefore there is no existing dependence between the web browser and the shipping server agent software in charge of accessing the local resources because the communication between the web browser and the shipping server agent relies on web standard protocols. As a result, there is no dependence between the shipping server agent software version and the web browser version, as opposed to an API component integrated within the web browser, which is directly managed by the web browser. The shipping server agent is a universal solution, which is compatible with all web browsers and all operating systems.

In a preferred embodiment, the client computer device comprises a browser session ID stored in the web browser, wherein the browser session ID is provided by the web browser via the shipping server agent to the web server for comparison with a session ID stored in a memory of the web server for providing an authorization by the shipping application of requests from the web browser to the shipping server agent for using the web services from the shipping server agent.

According to a feature of the invention, the shipping server agent comprises a web browser communication interface configured to listen to a pre-defined port for connections and requests from the web browser.

Preferably, the communication channels between the web browser and the web server or between the shipping server agent and the web server or between the shipping server agent and the web browser are hyper text transfer protocol secure protocol channels.

The shipping server agent application is more expansible in terms of functionalities as compared to an API component that is limited by the web browser managed sandbox. Security is better enforced with a shipping server agent compared to an applet API used through the NPAPI, which is known to be source of security threats. Another benefit of the shipping server agent is that if the web browser stops, the shipping server agent activity can continue—for example the printing can be performed—as opposed to an API component integrated within the web browser for which, if the web browser stops, the API component stops as the API component is instantiated by the web browser. Embodiments of the invention also concern a system for allowing secured access for a web browser of a client computer device to local resources, the system comprising a web server hosting a shipping application and executing the shipping application in response to web page requests received from the web browser, and a client computer device as described above.

BRIEF DESCRIPTION OF THE DRAWINGS

Other aspects, features and advantages of the teachings of the invention will become clearer to those ordinary skilled in the art upon review of the following description in conjunction with the accompanying drawings where.

DETAILED DESCRIPTION

Embodiments of the invention primarily involve the development of a third party software agent and the integration of this software agent as a server in the computer system of the user. This software agent, called Shipping Server Agent (SSA), runs as an embedded web server whose client is the web browser, and enables the web browser for interacting with the local operating system and thus accessing targeted local resources available to the local operating system. The interactions between the web browser and the SSA are performed through network communications using web services calls.

Figure 1:
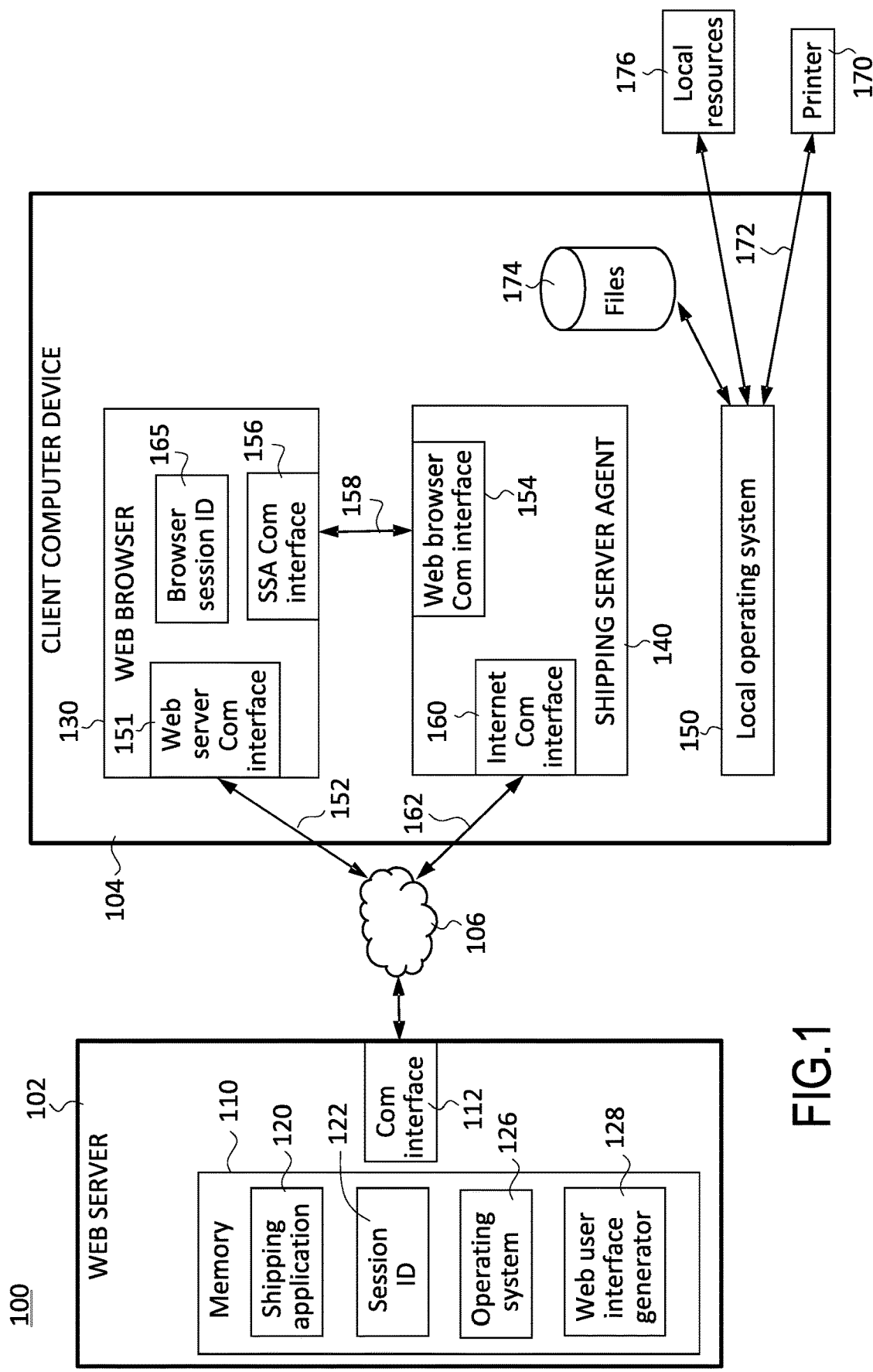
FIG. 1 illustrates a client-server configuration embodying the present invention is for a web browser to access local resources of a client computer device.

A system 100 embodying the invention is presented on FIG. 1, which describes a client-server configuration, where a web server 102 offers web shipping services to a client computer device 104 via an internet network 106. The web server 102 is a computing device such as those commonly known in the art and does not need, for an understanding of the present invention, to be described in details other than for the following characteristics. The web server 102 includes a memory 110, which may comprise random access memory, read only memory, removable storage, optical disk storage, disk drive storage, and combinations thereof, and a communication interface 112 allowing the web server to communicate via internet. The memory 110 stores a shipping application 120, a session identification (session ID) 122, as well as standard components for operating the web server such as a server operating system 126 or a web user interface generator 128. The session ID 122 is generated by the shipping application hosted in the web server when the web browser initiates a connection with the shipping application. This session ID is transmitted by the web server to the web browser and is used thereafter during the communication session opened between the shipping application hosted in the web server and web browser. During such a session, the web server 102 executes web services of the shipping application 126 in response to web page requests received from the client computer device 104. This session ID is also used for authorizing requests from the web browser to the SSA application.

The client computer device 104 is a computing device such as those commonly known in the art and includes a web browser 130 and a local operating system 150, which controls the general utilization and functionality of the client computer device. The user has access to the shipping application hosted by the web server 102 via the web browser 130 of the client computer device. The web browser includes a web server communication interface 151 for communicating with the web server 102 via the internet. In operation, the web browser 130 communicates web page requests to the web server, via a hyper text transfer protocol (http) communication channel 152, and receives codes from the web server via the communication channel 152. Preferably, the protocol of the communication channel 152 is a secured https protocol. The web browser 130 is an isolated application that runs codes provided by the web server within a restricted environment, typically a sandbox, which does not allow accessing directly protected resources of the client computer device 104. Therefore, the web browser cannot provide direct access to local resources for the shipping application hosted by the web server 102.

According to the illustrated embodiment of the invention, the computing device further comprises a SSA 140 that offers web services allowing direct access to protected local resources and provides these services to the web browser.

For example, the SSA allows printing as part of a process driven by the web browser without any display on the web browser of the printing control windows and any required associated user interactions. Without the SSA web services, a dialog box is displayed systematically by any application requesting the local operating system to print a document. Without the SSA web services, the web browser cannot either request any access to files stored in the client computer device 104.

The SSA includes a web browser communication interface 154 for communicating with the web browser and is configured to listen to a pre-defined port for new connections and requests from the web browser. The web browser is configured via the shipping application running on the web server for targeting this pre-defined port when a request for accessing local resources is required. Thus the web browser includes a SSA communication interface 156 for communicating with the SSA. The web browser and the SSA communicate via an https protocol channel 158. The SSA, running as an embedded web server, responds only to any well-formed https requests received on the pre-defined port. This pre-defined port is selected amongst the ports 8080 to 8100 of the client computer device 104, and in a particular embodiment this port can be configurable via some administration screens of the shipping application hosted by the web server.

The SSA offers to the web browser a limited list of specific web services in the form of pre-defined actions. This list of web services includes: providing access to a file stored on the client computer device in a particular folder, sending documents retrieved from a remote server to a particular printer for printing, storing a file stored in a particular folder in the client computer device, providing the list of printers accessible by the client computer device, providing the number of files printed by a particular printer accessible by the client computer device. Requests are directly addressed by the web browser to the SSA, and the SSA straight fully performs the requested action without any particular analysis, provided that the action is authorized. The SSA accepts requests only from the web browser. No intermediary component is used between the web browser and the shipping server agent such as a proxy for example. The direct communication ensures for optimal performances and user experience, which would be degraded by the introduction of intermediary components such as a proxy for example.

The SSA is accessed by the web browser via an internet protocol (IP) address dedicated to the SSA and by using a domain name specifically created for the SSA. The web browser accesses a particular web service amongst the web services, which are provided by the SSA and which allow direct access to local resources, by using a uniform resource locator (URL) composed of the specifically created domain name and of the pre-defined port and of the identification of that particular web service. In a preferred embodiment, the web browser utilizes the local resources of the client computer device 104 by accessing the loopback network endpoint: localhost. The loopback interface resolves the localhost endpoint to the IP address: 127.0.0.1. The specifically created domain name is configured to systematically redirect to 127.0.0.1. This configuration is performed during the registration of the domain name. In an embodiment, the web browser runs a Java script, which makes an https request to the SSA. The Java script is composed of an URL pointing to the localhost loopback network endpoint and a Java script object notation (JSON) payload. The SSA returns an https status and a JSON response confirming that the request has been taken into account or an error message.

The SSA also includes an internet communication interface 160 for communicating via the internet with the shipping application hosted in the web server 102. Preferably, the shipping application hosted in the web server and the SSA communicate via an https protocol channel 162 and use the port 443 of the client computer device dedicated for https internet communication. The SSA also communicates with the local operating system using native communication means attached to the local operating system.

In order to insure communication security with the SSA, and in particular for preventing from external sniffing, the SSA accepts only connections secured with cryptographic protocols. Preferably, communications between the web browser and the SSA, as well as communications between the web server and the web browser or between the web server and the SSA, are compliant with the Transport Layer Security (TLS) protocol. TLS certificates are managed by the web server and the SSA. For complying with the security protocol, the SSA is accessed by using the domain name specifically created for the SSA. This specific domain name redirects to localhost. A TLS certificate is attached to this domain name and is sent back by the SSA to the web browser for validation. A secured encrypted connection can then be established between the web browser and the SSA based on the TSL certificate exchange.

The authorization for the web browser to use the SSA web services is secured via the storage in the client computer device of a web browser session identification for the SSA (browser session ID) 164, which is associated with the web browser. This browser session ID 164 serves as an authenticating certificate authorizing requests from the web browser to the SSA application. When the web browser requests the use of some SSA web services for accessing local resources, the request from the web browser to the SSA contains the browser session ID 164. For authorizing the web browser request, the SSA application uses this browser session ID 164 and sends it to the shipping application where it is compared, for authorizing requests from the web browser to the SSA, with the session ID 122, which is stored in the memory 110 of the web server. Preferably, the web browser and the SSA and the shipping application communicate via hyper text transfer protocol secured (https) protocol channels.

In a preferred embodiment, the authorization for the web browser to use the SSA web services is only required regarding web services involving access to data stored on the web server and related to the shipping application. For example, the authorization is required for the web browser to use the SSA web service requesting access to a file stored on the web server and related to the shipping application. Such a file can in particular comprise data used for locally printing documents such as shipping labels by a printer connected to the client computer device. In order to improve the performance of the web browser actions, no authorization may be required for some local actions such as providing access to a file stored on the client computer device or printing with a printer connected to the client computer device.

The client computer device 104 is connectable with a peripheral printer 170 via a communication link 172. The SSA allows direct printing request from the web browser with the local resource printer 170. The SSA also allows requests from the web browser for accessing files 174 stored in the client computer device 104. The SSA can be used, once configured, for any local resources 176 other than a peripheral printer such as a weighing platform, any type of sensor or actuator.

As described above, an important characteristic of at least one embodiment of the invention is the triangular architecture designed for the communication between web browser 130 and the SSA 140 and the web server 102 in order to ensure for a secured access to local resources through the web browser, as well as direct communications between the web browser and the shipping server agent or between the shipping server agent and the web server without any intermediary component, therefore ensuring for optimal performances and user experience.

Figure 2:
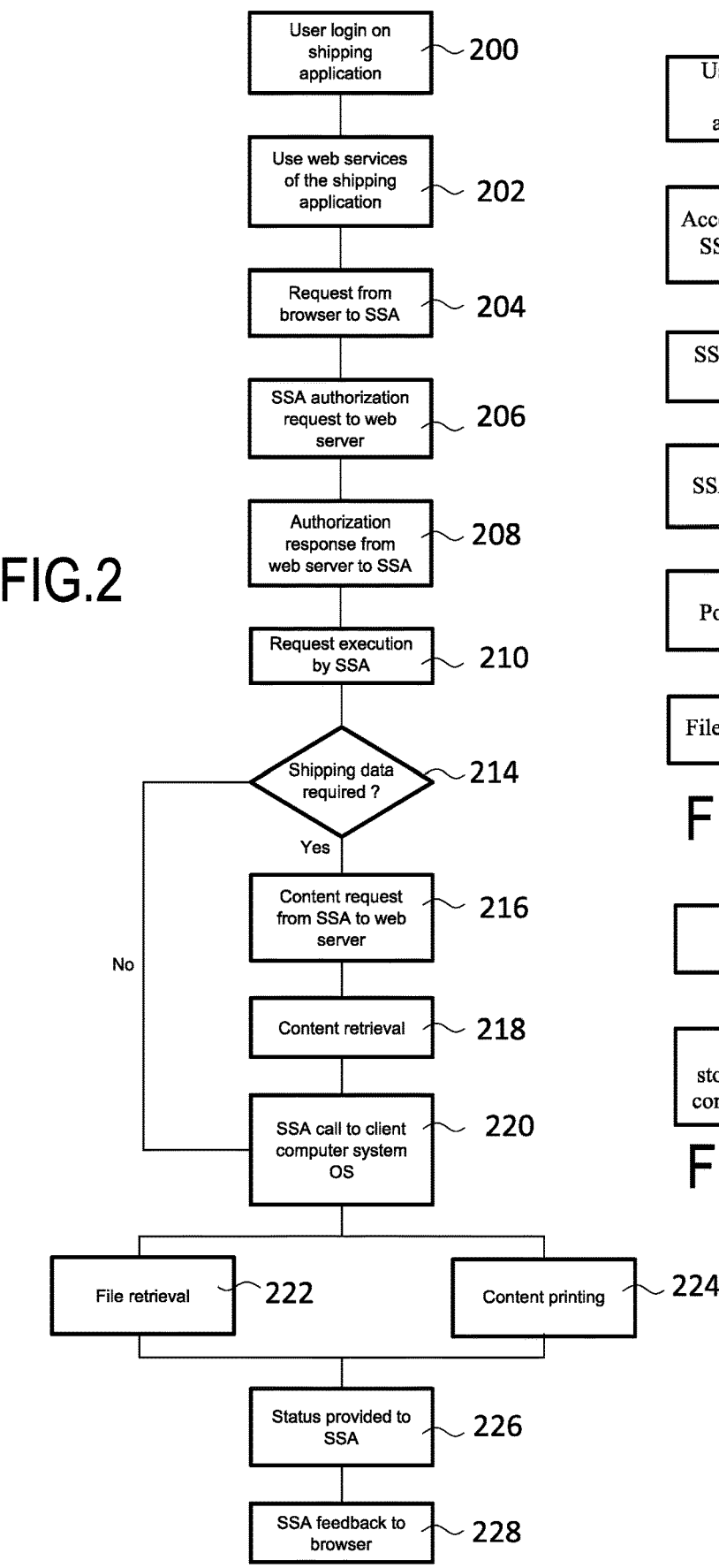
FIG. 2 represents a flow diagram of the method of the present invention relative to the operation of a shipping server agent.

FIG. 2 depicts a flow diagram of the method of implementing an embodiment of the present invention relative to the operation of the SSA. The method flow begins at act 200 where the user logs onto a shipping application web site hosted by a web server by utilizing a web browser. Web browsers are known in the art and a detailed discussion of their operation is not necessary for an understanding of the present invention. The user accesses and operates the web services of the shipping application via the web browser. The web server executes shipping application web services in response to web page requests received from the client computer device (act 202). When the web browser requests the access of local resources, a secured connection is established between the web browser and the SSA for using some of the SSA web services. The request from the web browser to the SSA regarding usage of a local resource contains the browser session ID 164, which is used for authorizing requests from the web browser to the SSA. The web browser also provides to the SSA a specific URL attached to the shipping application for submitting the browser session ID 164 for authorization. This specific authorization URL corresponds to a web service of the shipping application for authorizing the web browser request (act 204). Then, the SSA initiates the procedure for the authorization of the web browser request. This authorization procedure is executed with the shipping application hosted by the web server and from which the web browser is serving the web pages. The authorization procedure is based on a check on the session ID and is required each time the web browser needs to use the SSA web services for accessing local resources. SSA web services include accessing local resources such as a file system or a printer, as well as accessing content from the shipping application hosted by the web server such as shipping information, which could be required for some local printing. For authorizing the web browser request, the SSA performs a call on the specific authorization URL of the shipping application for submitting the browser session ID 164 (act 206). For authorizing web browser requests to the SSA, the shipping application compares the browser session ID provided by the web browser with the session ID 122 stored in the memory 110 of the web server. Based on this comparison, the shipping application sends back an authorization response to the SSA (act 208). In case the request is not authorized, a feedback is provided to the web browser by the SSA and the SSA does not execute the web browser request. In the standard case, the request is authorized and the communication between the web browser and the SSA is established. In a preferred embodiment, the authorization for the web browser to use the SSA web services is only required regarding web services involving access to data stored on the web server and related to the shipping application. For example, the authorization is required for requesting access to a file stored on the web server comprising data used for locally printing shipping labels by a printer connected to the client computer device. In such cases, acts 206 and 208 are optional. The next action performed by the SSA is the execution of the operation requested by the web browser, i.e. accessing local resources (act 210). If data from the shipping application hosted by the web server is required for completing the web browser request, the SSA sends a content request to the shipping application (acts 214 and 216). The shipping application performs the content retrieval and sends the retrieved content back to the SSA (act 218). Then, the SSA calls the operating system of the client computer device for accessing local resources (act 220). Based on the initial web browser request, some files can be accessed by the local operating system in act 222 or the printing of content can be performed in act 224. The local operating system can access and retrieve files locally stored in directories of the client computer device or files stored in a remote storing media accessible by the client computer device, such as a network disk. In the case of a file retrieval from the file directory of the local client computer device, the path to the file is pre-configured within the SSA configuration parameters. For security reasons, no path is provided in the request from the web browser in order to prevent any hacking to try and access local file tweaking paths in URL for accessing unauthorized resources. Once the actions associated with the local resources are completed, the SSA receives the status of these actions (act 226). In act 228, the SSA feeds back the status to the web browser and eventually other information such as some content retrieved from the local client computer device.

In a particular embodiment, printing content directly onto a designated locally accessible printer is an operation delegated to the SSA as well as the providing of some of this content. The content to be printed can be provided either in the form of a file content or as a link to a file prepared on the web server hosting the shipping application, i.e. a URL pointing towards this file. Typically, the shipping information results from an online preparation performed by the user with the shipping application for a particular shipment. Some of the content to be printed can be provided by the web browser when the web browser sends a print request to the SSA. Content to be printed can also be received by the SSA from the shipping application or from files from the file directory of the local client computer device. Shipping systems are often used by a client running an e-commerce application, which can be installed on a local client computer device or which can be accessed by the local client computer device on an ecommerce web server dropping files on the local client computer or on a network disk accessible by the SSA. Typically, this e-commerce application generates order information compiled into a file or generates multiple files grouped into a directory, which are stored in the local client computer device. In order to prepare for a shipment, the shipping application requires access to this order information stored on the local client computer device.

Figure 3A:
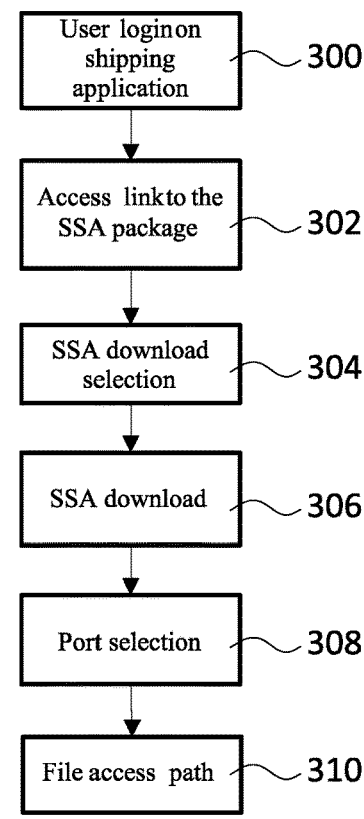
FIG. 3A represents a flow diagram of the method of the present invention relative to the installation and configuration of a shipping server agent and the session ID generation.
Figure 3B:
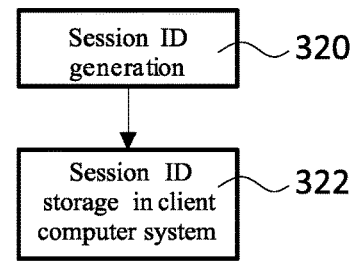
FIG. 3B represents a flow diagram of the method of the present invention relative to the web browser connection with the shipping application and the session ID generation.

FIG. 3B depicts a flow diagram of the method of implementing an embodiment of the present invention relative to the installation and configuration of the SSA. The SSA is installed on a local client computer device preferably by a software download via internet. The method flow begins at act 300 where the user logs onto a shipping application web site hosted by a web server by utilizing a web browser for internet entry. Via the web browser, the user accesses a web page containing a link to the SSA package (act 302). The user selects on the web browser the downloading via the internet of the SSA application from the shipping application (act 304). The download of the SSA application file is performed from the web server onto the local client computer device 104 via the internet 106. Preferably, the downloaded SSA application file is a binary file ready for execution. In an embodiment, when the user clicks on a link of the shipping application hosted by the web server, the downloading of a Java Network Launch Protocol (JNLP) file is performed. This JNLP file corresponds to a text file that contains a link to the executable SSA binary file located on the web server. The JNLP file is interpreted by the Java Runtime Environment (JRE) of the local client computer device and the binary file of the SSA application is downloaded into the local JRE cache ready to be executed (act 306). The configuration of the SSA includes the following acts. The listening port, which the SSA uses for listening to for new connections and requests from the web browser, is configured in act 308. In one embodiment, the user is requested to select the listening port for the SSA. The user can select amongst the ports 8080 and 8100. The port proposed by default is port 8080. The value of the selected port is stored in the web server memory 110, which is associated to the shipping application and the SSA. This value of the selected port is also transmitted to the SSA via the web browser, and is memorized in the client computer device, in association with the shipping application and the SSA In another embodiment, the listening port is automatically selected by the client computer system based on the availability of the ports. After the port selection, the user is requested to define the path for the SSA to access a file or a directory of the local client computer device (act 310).

Thenceforward, the web browser can request the use of some SSA web services for accessing local resources, in particular when the user utilizes web services of the shipping application via the web browser. FIG. 3B depicts a flow diagram of the method of implementing an embodiment of the present invention relative to the web browser connection with the shipping application and the session ID generation. Each time the web browser initiates a connection with the shipping application hosted in the web server, the shipping application generates a session ID 122. The session ID 122 is stored in the web server and is associated with the shipping application hosted in the web server (act 320). The session ID is communicated by the shipping application to the web browser and is used thereafter during the communication session opened between the shipping application hosted in the web server and web browser. The session ID is memorized in the client computer device 104 as a browser session ID 164 and is associated with the web browser (act 322). This Session ID 164 is also used for authorizing requests from the web browser to the SSA application. A new session ID 122 is generated each time the user logs into the shipping application hosted in the web server.

Changing the SSA configuration may need to be performed after the installation of the SSA. The SSA provides an access for the user for changing the SSA configuration, either for changing the listening port, which SSA uses to listen to for new connections and requests, or for changing the path for the SSA to access a file or a directory of the local client computer device.

Although the installation of the SSA on a local client computer device is described above as performed by a software download via internet, this installation can also be performed by copying the SSA binary onto the local client computer device from a physical media such as USB key or a CD ROM.

More generally, although the embodiments of the invention have been described in the case of shipping applications and more particularly for enabling a web browser for accessing resources of the local client computer device, it is to be understood that the invention is not limited to the disclosed embodiments. The invention can also be applied to other applications than shipping applications and for enabling other client applications than a web browser for accessing resources of the local client computer device. In particular, an SSA accepts any https connections that can either come from a web socket connection or a Representational State Transfer (REST) call coming from any local sources having access to the port dedicated to the SSA and to the SSA IP address.

Figure 4:
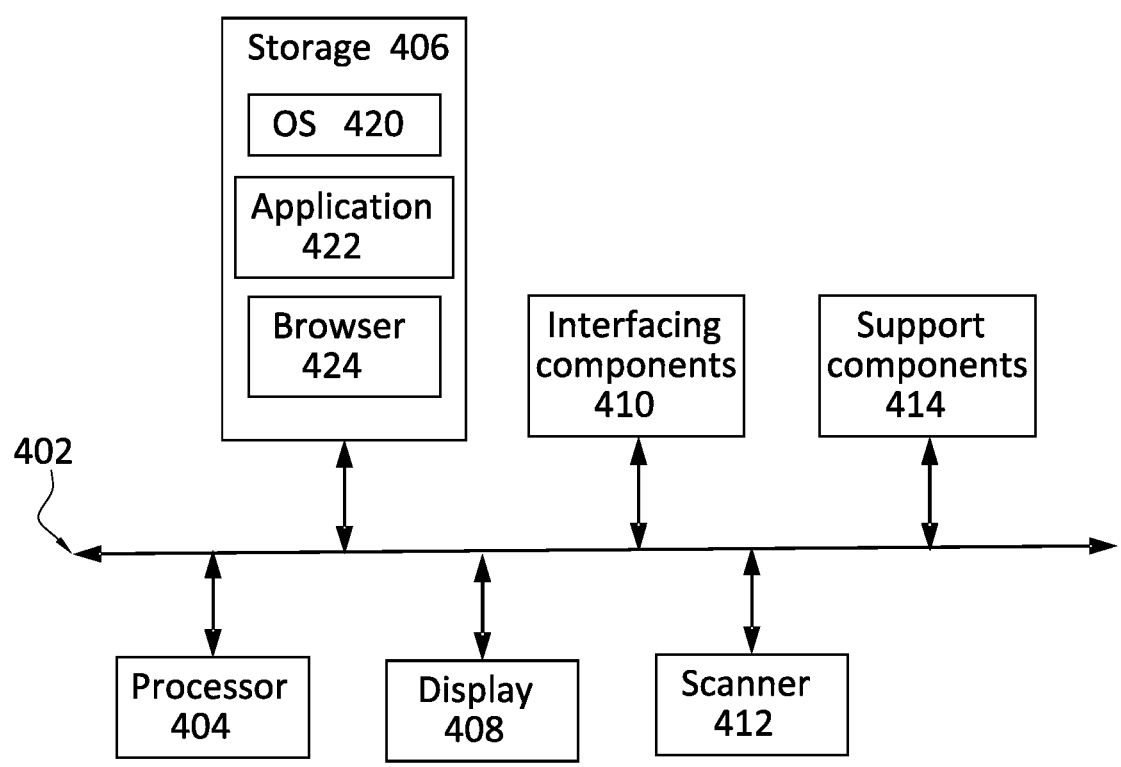
FIG. 4 illustrates a schematic representation of an example client computer device suitable for implementing embodiments of the invention.

FIG. 4 shows a schematic representation of an example client computer device 104 suitable for implementing embodiments of the invention. The client computer device includes a bus 402, which connects major components of the client computer device 104, such as a processor 404, one or more memory storage components 406 such as RAM, ROM, flash RAM, hard drive, flash drive, or the like and generally a display 408, with eventually a keyboard. Additional components can also be connected to bus 402 such as interfacing components loud speakers or microphones or cameras 410 or a scanner 412 for scanning barcodes for example or other various support components 414 facilitating the processor operation such as clock components or input/output components and the likes.

The bus 402 allows data communication between the processor 404 and the different components connected to the bus, and in particular with the memory storage 406. The memory storage 406 generally includes the main memory into which an operating system 420 and application programs 422 are loaded. The SSA code is an example of an application program stored in the memory storage 406. The memory storage also can contain, among other codes, software which is controls basic hardware operation of the system, such as interactions with peripheral components. The memory storage 406 comprises, for example, the web browser code 424 as well as the memory storing the browser session ID.

Additional components may be included in the client computer device 104 as will be understood by a person skilled in the art; conversely, all of the components shown in FIG. 4 need not be present to practice the invention. The components can be interconnected in different ways from that shown. The operation of a computer such as that shown in FIG. 4 is readily known in the art and is not discussed in detail in this application.

The invention claimed is:

1. A method of allowing secured access for a web browser executing on a client computer device to local resources that are local to the client computer device, wherein a web server hosting a shipping application executes said shipping application at the web server in response to web page requests received from said web browser executing on the client computer device, said method comprising:
   requesting by said web browser directly to a shipping server agent of said client computer device a usage of a web service of said shipping server agent for accessing said local resources,
   requesting by said shipping server agent directly to said shipping application an authorization for said usage of a web service by said web browser,
   providing an authorization response from said shipping application directly to said shipping server agent regarding said usage of a web service by said web browser, and
   accessing said local resources that are local to the client computer device by said shipping server agent according to said requesting by said web browser.

2. The method of claim 1, wherein said authorization response is based on comparing a session ID stored in a memory in said web server with a browser session ID memorized in said client computer device wherein said browser session ID is provided by said web browser via said shipping server agent to said web server.

3. The method according to claim 1, wherein said web browser provides said shipping server agent with an authorization uniform resource locator attached to said shipping application corresponding to an authorization web service of said shipping application for said authorization for said usage of a web service.

4. The method according to claim 1, wherein said web browser is configured via said shipping application for targeting a pre-defined port, which said shipping server agent listens to for connections and requests.

5. The method according to claim 4, wherein said shipping server agent is accessed by said web browser via a dedicated internet protocol address for said shipping server agent.

6. The method according to claim 4, wherein a web service of said shipping server agent is accessed by said web browser by using a uniform resource locator composed of said dedicated internet protocol address and of said pre-defined port and of an identification of said web service.

7. The method according to claim 1, wherein said shipping server agent is accessed by using an internet domain name specifically created for said shipping server agent.

8. The method according to claim 1, wherein said shipping server agent runs as an embedded web server independently from said web browser and sends content requests to said shipping application when data from said shipping application is required for completing said requesting by said web browser.

9. The method according to claim 1, wherein said web services of said shipping server agent include direct printing on a local printer controlled by a local operating system and accessing files stored in said client computer device.

10. The method according to claim 1, wherein a path for said accessing files stored in said client computer device is pre-configured within the shipping server agent configuration parameters and no path is provided in said requesting said usage of a web service of shipping server agent by said web browser.

11. The method according to claim 1, wherein said shipping server agent communicates with said web browser and said web server via hyper text transfer protocol secure protocol channels.

12. The method according to claim 1, wherein the installation of said shipping server agent application is performed by a download via the internet from said shipping application onto said client computer device.

13. The method according to claim 12, wherein said download includes selecting a listening port, which said shipping server agent uses for listening to said requesting said usage of a web service by said web browser, and defining a path for said accessing files stored in said client computer device.

14. The method according to claim 13, wherein said web browser is configured via said shipping application for sending requests to said pre-defined port when said web browser requires using said web services from said shipping server agent.

15. The method according to claim 14, wherein said session ID is generated by said shipping application and transmitted by said web server to said web browser.

16. The method according to claim 15, wherein said shipping server agent responses to requests from said web server only.

* * * * *